May 29, 1928. 1,671,668
L. C. CATTOI
VEHICLE SPRING SHACKLE
Filed Sept. 15, 1926     3 Sheets-Sheet 1
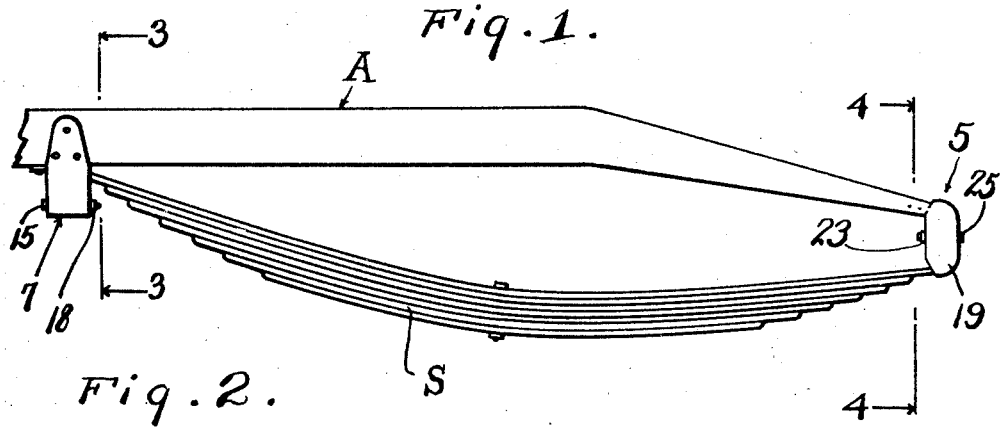
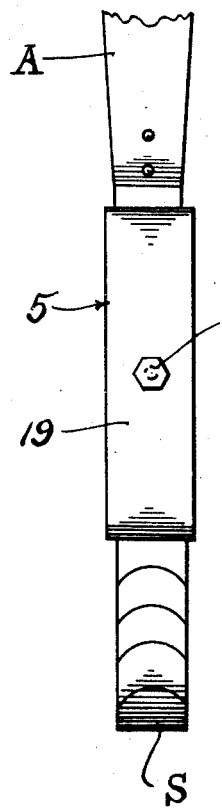
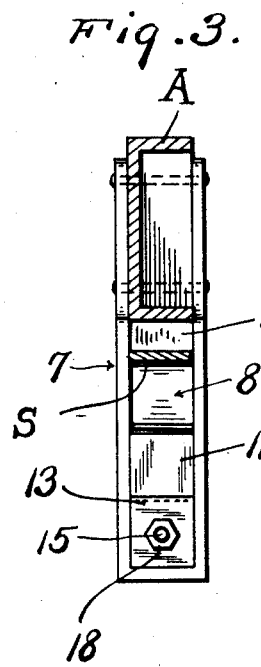
Inventor
Louis C. Cattoi
By L. B. James
Attorney

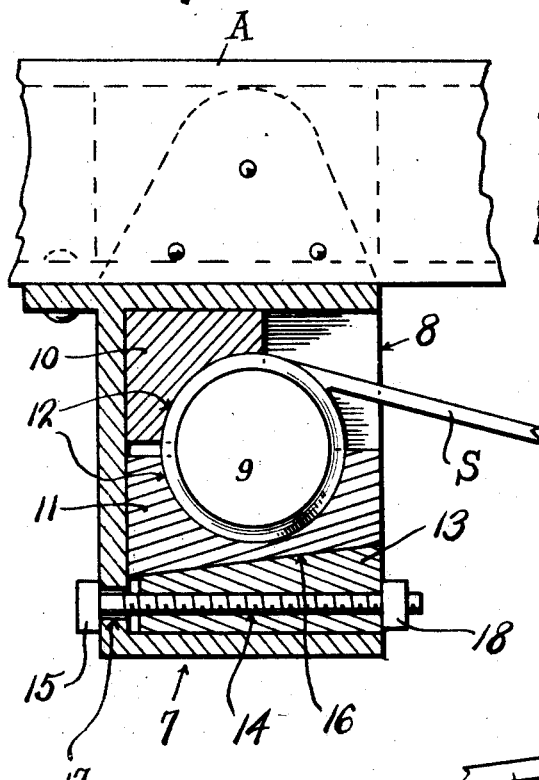
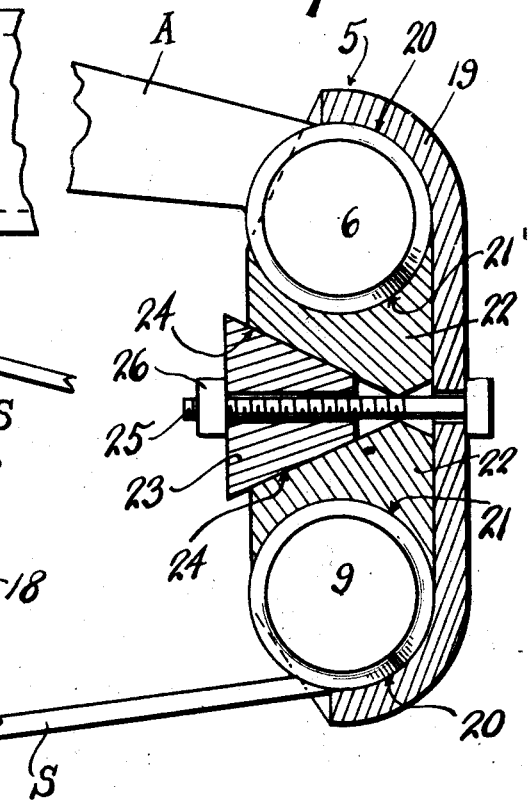
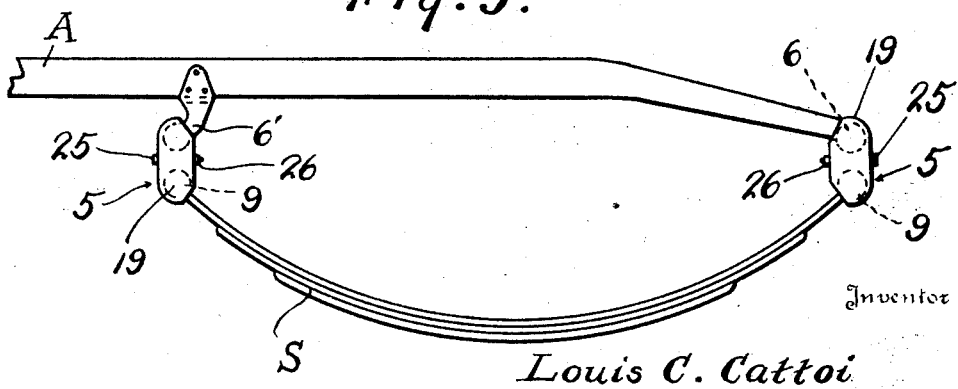

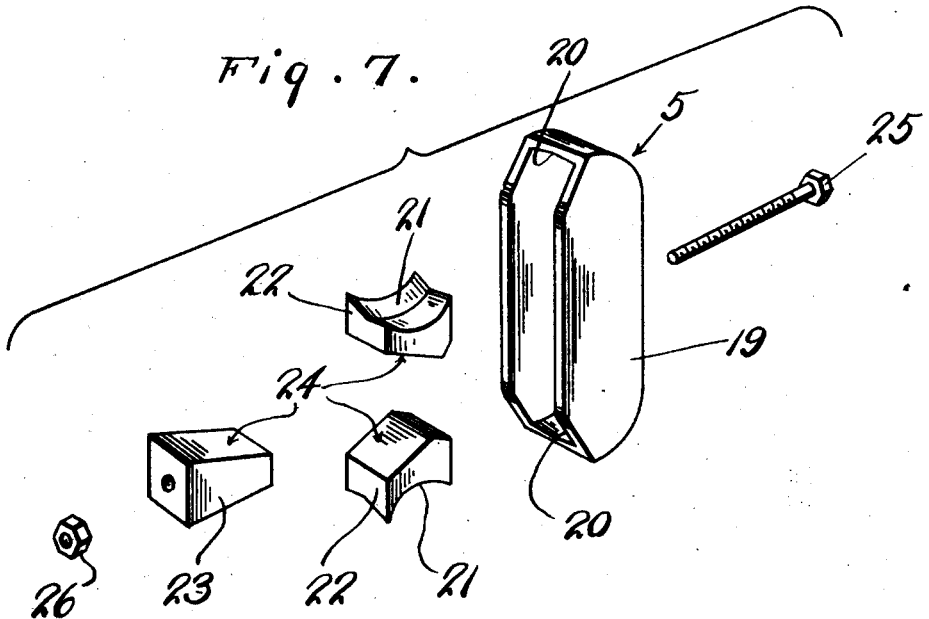
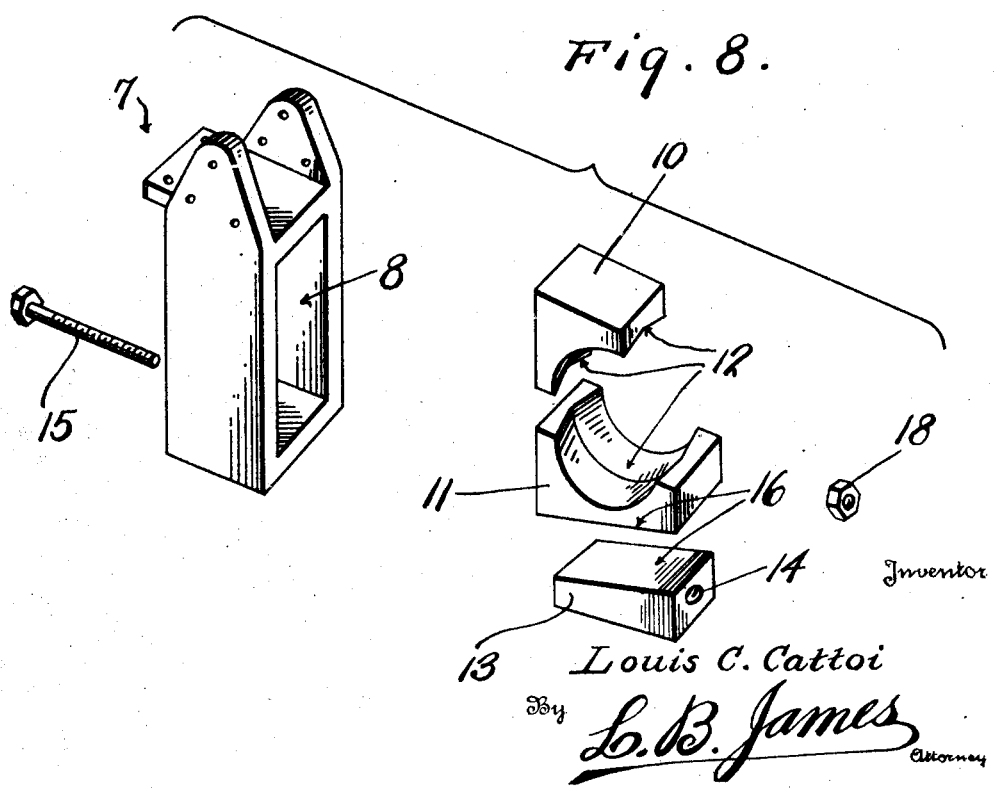

Patented May 29, 1928.

1,671,668

UNITED STATES PATENT OFFICE.

LOUIS C. CATTOI, OF HURLEY, WISCONSIN, ASSIGNOR OF ONE-EIGHTH TO AUGUST ERSPAMER AND ONE-EIGHTH TO LENO ERSPAMER, BOTH OF HURLEY, WISCONSIN.

VEHICLE SPRING SHACKLE.

Application filed September 15, 1926. Serial No. 135,662.

This invention relates to the leaf springs of vehicles and more particularly to the shackles thereof.

The primary object of this invention resides in the provision of means whereby the shackles of vehicle leaf springs will be operably connected together for adjustment to take up wear and obviate rattle at their joints.

Another object of this invention resides in the provision of means whereby the shackles of vehicle leaf springs can be readily disassembled in the minimum length of time.

A further object of this invention resides in the provision of means whereby the shackles of vehicle leaf springs will be anchored to the frame of the vehicle so as to permit the usual action thereof and yet be journaled for quick removal or adjustment.

With these and other objects in view, this invention resides in certain novel features of construction, arrangement and combination of elements to be hereinafter set forth in the specification, illustrated in the accompaying drawings, and pointed out in the appended claims and, while the disclosure depicts my present conception of the invention, the right is reserved to resort to such changes in construction as come within the scope of the claims.

In the accompanying drawings forming a part of this application:

Fig. 1 is a side view of a portion of a vehicle frame, showing the elements of this invention associated therewith.

Fig. 2 is an enlarged end view thereof.

Fig. 3 is a sectional view approximately on line 3—3 of Fig. 1.

Fig. 4 is a similar view on line 4—4 of Fig. 1.

Fig. 5 is an enlarged, longitudinal, sectional view of one end of the spring and its associated elements.

Fig. 6 is a similar view of the other end of the spring and its associated elements.

Fig. 7 is a detail perspective view of the pivoted shackle in juxta-position.

Fig. 8 is a similar view of the stationary shackle.

Fig. 9 is a side view of a portion of a vehicle frame, showing the elements of this invention associated therewith in a modified form.

In the present illustration of this invention the letter A designates a portion of one member of a vehicle frame with which is associated a leaf spring S connected thereto through the instrumentality of shackles 5 and 7 constituting the subject-matter of this invention.

Preferably secured to the free end of the vehicle frame member A is an oppositely tapered trunnion 6 while removably secured to the intermediate portion of the frame member is the stationary shackle 7, the same being herein shown in the form of a housing having an open side 8 presented toward the trunnion 6.

Formed on the opposite ends of the leaf spring S are trunnions 9, similar to the trunnion 6, secured to the vehicle frame.

Removably carried in the stationary shackle are upper and lower bearing blocks 10 and 11, which are provided with seats 12 adapted to conform to the peripheries of the spring trunnions 9 for pivotally anchoring one end of the spring to the frame.

Associated with one of the bearing blocks, preferably the lowermost one herein designated 11, is a wedge 13 having a threaded aperture 14 therein for the reception of a threaded bolt 15 and, through the instrumentality of coinciding inclined surfaces 16 on the bearing block 11 and wedge 13, the bolt which loosely passes through an aperture 17 in the stationary shackle and threadedly engages the wedge, will readily clamp the associated trunnion of the spring between the bearing blocks to any degree of friction desired and, to prevent displacement of the bolt and wedge, a lock-nut 18 is screwed on the free end of the bolt against the wedge.

The opposite end of the spring is pivotally connected to the trunnion 6 of the frame through the instrumentality of the shackle 5, which comprises a housing 19 having seats 20 therein, conforming to the peripheries of the trunnions 6 and 9, for coaction with similar seats 21 formed in bearing blocks 22 retained in the housing by a wedge 23, which is actuated along inclined sides 24 of the bearing blocks by a bolt 25 loosely passing through the housing and provided with a nut 26 on its free end to prevent displacement of the wedge 23.

Through the provision of the aforesaid association of elements, it will be readily observed that, upon tightening the nut 26 against the wedge 23, the bearing blocks will be spread, thus closing the opposed seats of the housing and bearing blocks, whereupon the trunnions 6 and 9 will not only be locked against longitudinal displacement, but the proper degree of friction will be established to permit the spring trunnion to rock in its bearing and the entire shackle to rock on the trunnion of the frame. This assemblage of elements, as well as those included in the stationary shackle, permits the spring to function in the usual manner and, while the degree of friction is thus regulated, provision is made for retaining alignment of the bearings through the instrumentality of the oppositely tapered trunnions, especially for the reason that tightening of the bearing blocks readily draws the apex of the trunnions to the bases of their seats.

Although, I have herein shown a leaf spring as connected to a vehicle frame by associated stationary and pivoted shackles, construction of certain types of vehicles may necessitate the use of pivoted shackles at both ends of the spring and, to provide for such association of elements, the frame will be provided with a stationary trunnion as a substitute for the stationary shackle.

With this invention fully set forth, it is manifest that means are provided to readily and quickly adjust and remove the frame connected ends of vehicle springs and, through the instrumentality of the association of elements set forth, rattle from the shackles of springs will be obviated.

Having thus fully described my invention, what I claim and desire to protect by Letters Patent is:

1. The combination with a leaf spring having trunnions at its extremities and a vehicle frame having a stationary and a pivoted shackle, of bearing blocks engaging the trunnions of the spring, wedges associated with the bearing blocks, and means actuating the wedges against the bearing blocks to close their trunnion receiving seats.

2. The combination with a vehicle spring having tapered trunnions formed on its extremities, of bearing blocks having seats conforming to the peripheries of the spring trunnions, shackles supporting the bearing blocks, and means for simultaneously adjusting the bearing blocks against the spring trunnions and holding them in the shackles.

In testimony whereof I affix my signature.

LOUIS C. CATTOI.